United States Patent
Louey et al.

(10) Patent No.: US 10,452,077 B2
(45) Date of Patent: Oct. 22, 2019

(54) AUTONOMOUS PERSONAL MOBILITY SYSTEMS

(71) Applicant: Ford Global Technologies LLC, Dearborn, MI (US)

(72) Inventors: Andrew Louey, Carlton North (AU); Gaetano D'Agata, Westmeadows (AU); Graeme Cameron, Ivanhoe (AU); Howard Schulz, Camberwell (AU); David Evans, Highton (AU)

(73) Assignee: Ford Global Technologies LLC, Dearborn, MI (US)

( * ) Notice: Subject to any disclaimer, the term of this patent is extended or adjusted under 35 U.S.C. 154(b) by 123 days.

(21) Appl. No.: 15/707,163

(22) Filed: Sep. 18, 2017

(65) Prior Publication Data

US 2018/0101179 A1 Apr. 12, 2018

(30) Foreign Application Priority Data

Oct. 12, 2016 (CN) .......................... 2016 1 0892510

(51) Int. Cl.
*G05D 1/02* (2006.01)
*G08G 1/00* (2006.01)
(Continued)

(52) U.S. Cl.
CPC .......... *G05D 1/0274* (2013.01); *B60L 3/0015* (2013.01); *B60L 5/005* (2013.01);
(Continued)

(58) Field of Classification Search
CPC ....... G05D 1/0274; B60L 53/12; B60L 53/14; B60L 50/52; B62K 5/027
See application file for complete search history.

(56) References Cited

U.S. PATENT DOCUMENTS

| | | | | |
|---|---|---|---|---|
| 4,823,900 A | * | 4/1989 | Farnam | A61G 5/046 180/251 |
| 7,886,855 B2 | * | 2/2011 | Wang | A61G 5/045 180/65.1 |

(Continued)

FOREIGN PATENT DOCUMENTS

| | | |
|---|---|---|
| CN | 204250256 U | 4/2015 |
| CN | 205113562 U | 3/2016 |

(Continued)

OTHER PUBLICATIONS

"Honda Wants to Replace Walking With Some Truly Bizarre Vehicles", Danielle Muoio, Oct. 15, 2015, 14 Pages.

*Primary Examiner* — Behrang Badii
*Assistant Examiner* — Daniel L Greene
(74) *Attorney, Agent, or Firm* — Brandon Hicks; Kolitch Romano LLP (57) ABSTRACT

Autonomous personal mobility systems including one or more personal mobility vehicles, each personal mobility vehicle including a navigation system configured to provide autonomous point-to-point navigation within a specified geographic area, and one or more sensors configured to detect obstructions proximate to the personal mobility vehicle, so as to enable the navigation system to avoid the detected obstructions. The system includes one or more kiosks configured to store the one or more personal mobility vehicles and charge the one or more personal mobility vehicles while stored. In some examples, the systems include a smartphone app interface to the navigation system.

16 Claims, 5 Drawing Sheets

(51) Int. Cl.
| | |
|---|---|
| *G08G 1/16* | (2006.01) |
| *B62K 5/027* | (2013.01) |
| *B62K 15/00* | (2006.01) |
| *G06Q 30/06* | (2012.01) |
| *G05D 1/00* | (2006.01) |
| *B60L 3/00* | (2019.01) |
| *B60L 5/00* | (2006.01) |
| *B62H 5/00* | (2006.01) |
| *B60L 53/14* | (2019.01) |
| *B60L 50/51* | (2019.01) |
| *B60L 50/52* | (2019.01) |
| *B60L 53/12* | (2019.01) |
| *G08G 1/0968* | (2006.01) |
| *B62J 99/00* | (2009.01) |
| *B60L 50/64* | (2019.01) |

(52) U.S. Cl.
CPC ............. *B60L 50/51* (2019.02); *B60L 50/52* (2019.02); *B60L 53/12* (2019.02); *B60L 53/14* (2019.02); *B62H 5/00* (2013.01); *B62K 5/027* (2013.01); *B62K 15/00* (2013.01); *G05D 1/0088* (2013.01); *G05D 1/0212* (2013.01); *G05D 1/0214* (2013.01); *G05D 1/0225* (2013.01); *G05D 1/0278* (2013.01); *G06Q 30/0645* (2013.01); *G08G 1/096838* (2013.01); *G08G 1/165* (2013.01); *G08G 1/166* (2013.01); *G08G 1/207* (2013.01); *B60L 50/64* (2019.02); *B60L 2200/24* (2013.01); *B60L 2220/16* (2013.01); *B60L 2220/42* (2013.01); *B60L 2220/44* (2013.01); *B60L 2240/42* (2013.01); *B60L 2250/16* (2013.01); *B60L 2250/20* (2013.01); *B62J 2099/002* (2013.01); *B62J 2099/0026* (2013.01); *B62K 2204/00* (2013.01); *G05D 2201/0212* (2013.01); *Y02T 10/646* (2013.01); *Y02T 10/705* (2013.01); *Y02T 10/7005* (2013.01); *Y02T 10/7072* (2013.01); *Y02T 90/122* (2013.01); *Y02T 90/14* (2013.01)

(56) References Cited

U.S. PATENT DOCUMENTS

| | | | |
|---|---|---|---|
| 8,430,192 | B2 | 4/2013 | Gillett |
| 8,583,302 | B2 | 11/2013 | Akimoto et al. |
| 9,283,848 | B2 | 3/2016 | Parienti |
| 9,720,410 | B2 * | 8/2017 | Fairfield ............... G05D 1/0044 |
| 2009/0320713 | A1 * | 12/2009 | Amiri .................... B61B 13/00 104/281 |
| 2015/0321722 | A1 | 11/2015 | Dadoosh et al. |
| 2017/0266069 | A1 * | 9/2017 | Lozano ................ G05D 1/0212 |

FOREIGN PATENT DOCUMENTS

| | | | | |
|---|---|---|---|---|
| GB | 2307453 | A | * 5/1997 | ............ A61G 5/023 |
| WO | 0236419 | A1 | 5/2002 | |

* cited by examiner

AUTONOMOUS PERSONAL MOBILITY SYSTEMS

RELATED APPLICATION

This application claims the benefit of Chinese Patent Application No.: CN 201610892510.3 filed on Oct. 12, 2016, the entire contents thereof being incorporated herein by reference.

FIELD

The present disclosure relates generally to local and regional area mobility systems, in particular, relates to mobility systems designed to transport a person throughout a predetermined area or region on an autonomous basis and a personal mobility vehicle in the personal mobility systems.

BACKGROUND

One of the first obstacles encountered by travelers visiting new and/or unfamiliar areas is finding a way around. Many travelers desire modes of transportation that offer flexibility and fast availability, to maximize time spent at destinations. However, lack of knowledge of the location of points of interest and how to get from point A to point B complicates personal transportation options. These complications are often compounded by a lack of knowledge of the existence of various points of interest. In other cases, travelers may know what sorts of services or attractions they would like to visit, but be unaware of the local names of the services and/or attractions. For example, travelers may know that they want to go shopping for clothes or gifts, but are unfamiliar with the names of various stores offering such goods in a destination, let alone their location or how to get there.

Known mobility and navigation methods are not entirely satisfactory for solving the range of obstacles presented to travelers. For example, while taking a taxi or other hired vehicle solves the problem of knowing how to get to various points of interest, such transport options may not offer suggestions for points of interest, and lack the easy availability of transportation options that are personal to a traveler. Travelers must wait for taxis, either by calling or hailing, which can diminish time spent at attractions. Likewise, public transit typically involves some form of waiting, often lacks information as to points of interest, and with the possible exception of widely known attractions, fails to provide directions to points of interest. Renting a car offers great personal flexibility, but often without guidance as to points of interest. Moreover, a rental car, as well as a taxi or hired vehicle, is not feasible where points of interest are located in pedestrian-only areas, such as shopping centers and pedestrian malls. While walking is the ultimate form of personal transportation, walking can be comparatively slow, limiting the amount of ground and distance between points of interest that can be covered, and becomes increasingly tiresome and difficult when a person has multiple bags or cargo to haul.

In addition, while smartphones have greatly improved the ability of travelers to obtain information about destinations as well as travel directions, smartphones do not always provide easily accessible information about specific destinations such as shopping centers or urban cores, and further may depend upon a traveler obtaining an appropriate SIM card to even enable access to a wireless network proximate to points of interest.

Chinese publication CN205113562U discloses an electric powered scooter, which includes GPS for navigation and route planning, and sensors for obstacle detection. However, the scooter does not provide autonomous navigation and an autonomous driving system that are adapted to a specific region.

PCT Publication No. WO 02/36419 A1 discloses a three-wheeled collapsible electric scooter with a provision to include a PDA for GPS navigation. The publication also discloses a rental terminal as a possible means for temporarily obtaining the scooter. However, the scooter does not provide guidance as to points of interest in a specific region. A user may need to go through a general GPS system and may have difficulty finding a specific point of interest without additional assistance. Further, the user needs to operate the scooter because there is no autonomous driving system.

Thus, there exists a need for personal transportation systems that improve upon and advance the design of known personal transportation systems and options.

SUMMARY

The present disclosure is directed to an autonomous personal mobility system comprising one or more personal mobility vehicles, each personal mobility vehicle further comprising a navigation system configured to provide autonomous point-to-point navigation within a specified geographic area, and one or more sensors configured to detect obstructions proximate to the personal mobility vehicle, so as to enable the navigation system to avoid the detected obstructions; and one or more kiosks configured to store the one or more personal mobility vehicles and charge the one or more personal mobility vehicles while stored.

In one embodiment, the navigation system is programmed with points of interest within the specified geographic region and the one or more personal mobility vehicles cannot be used outside of the specified geographic area.

In another embodiment, each of the one or more kiosks charges the one or more personal mobility vehicles via an induction charging rail.

In another embodiment, each of the one or more kiosks further allows one of the personal mobility vehicles to be rented.

In another embodiment, each of the personal mobility vehicles has a three-wheel configuration.

In another embodiment, each of the personal mobility vehicles is capable of folding so as to minimize space consumed in one of the kiosks.

In another embodiment, each personal mobility vehicle further comprises a touch screen interface for interacting with the navigation system.

In another embodiment, the system further comprises a smartphone application that allows a user to summon a personal mobility vehicle, and interact with the navigation system.

In another embodiment, the specified geographic region is an airport, a shopping center, a transportation hub, a tourist attraction, or an urban core.

According to another aspect, an autonomous personal mobility system for transportation throughout a specified geographic region comprises a plurality of three-wheeled personal mobility vehicles, each of the plurality of personal mobility vehicles comprising a navigation system, an object collision avoidance system, and an interface configured to interact with the navigation system; and at least one kiosk configured to store and charge each of the plurality of personal mobility vehicles. The kiosk further comprises a terminal configured to allow a user to rent a personal mobility vehicle, wherein the navigation system is programmed with a plurality of points of interest within the specified geographic region, the interface enables the user to select one of the points of interest, and the navigation system and object collision avoidance system are configured to allow each personal mobility vehicle to autonomously navigate to the selected point of interest without user interaction.

In one embodiment, the system further comprises a smartphone application configured to interact with the kiosk to allow the user to rent one of the plurality of personal mobility vehicles, and to interact with the navigation system to summon the personal mobility vehicle and select a point of interest.

In another embodiment, each of the plurality of personal mobility vehicles is configured to fold into a storage position while stored within the kiosk.

In another embodiment, each of the plurality of personal mobility vehicles is incapable of operating outside of the specified geographic region.

In another embodiment, the smartphone application is further configured to transmit the location of the user to the navigation system, and the navigation system is further configured to navigate the personal mobility vehicle to the user's location upon the user's request.

According to another aspect, a personal mobility vehicle for transportation throughout a specified geographic region comprises a key to start an operation and the key including an identification code associated with a service provider; a navigation system, wherein the navigation system is programmed with a plurality of points of interest within the specified geographic region according to the identification code; a user interface for a user to select a point of interest; an object collision avoidance system to detect presence of objects surrounding the personal mobility vehicle; a drive wheel controller; and a mobility control system configured to receive a user input and instruct the drive wheel controller to navigate the personal mobility vehicle to the selected point of interest automatically according to the information from the navigation system and the object collision avoidance system.

In one embodiment, the mobility control system is further configured to control the drive wheel controller to follow a traffic flow at a walking pace or a jog pace.

In another embodiment, the personal mobility vehicle is a three-wheel vehicle, and includes a seat movably attached to a base to enable a storage and stack mode, and is further configured to allow a seated posture and a standing posture of the user, wherein the personal mobility vehicle further includes a pivoting deck and a touch screen including the user interface.

In another embodiment, the drive system includes two non-pneumatic type drive wheels and a motor mounted on a hub and a rechargeable battery to power the motor; and steering is provided by left-only, right-only, forward and reverse electronic actuation of the drive wheels.

In another embodiment, the personal mobility vehicle further comprises a manual driving button on the user interface, wherein an autonomous driving mode is overridden when the user activates the manual driving button.

In another embodiment, the mobility control system is configured to receive specific destination information from a service provider and display the specific destination information on the user interface, wherein the specific destination information includes at least one of new books available at a library, a gate or a flight information from an airport, shopping information for a shopping mall, zone access restriction based on security, safety, and theft prevention.

DETAILED DESCRIPTION

The disclosed autonomous personal mobility systems will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various autonomous personal mobility vehicles are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

With reference to FIGS. 1-6, an example autonomous personal mobility system, system 100, will now be described. System 100 functions to provide a personal transport option for a designated geographic area, with a fleet of vehicles available for rent that are further capable of autonomously navigating a user to any point of interest within the designated geographic area. The reader will appreciate from the figures and description below that System 100 addresses shortcomings of conventional transportation systems and solutions.

For example, system 100 provides a personal vehicle that not only provides navigational guidance to points of interest, but also will autonomously drive itself (along with a passenger and their cargo) to selected points of interest. Such a personal vehicle allows a user to comfortably navigate areas greater than would be practical on foot, and further can offer some cargo carrying capacity. The personal vehicles of system 100 are rentable on-demand, so a user need not wait for public transit or a hired vehicle, thus providing less waiting. Moreover, system 100 can include an interface with a selection of a variety of points of interest within a served geographic area, thereby allowing users to become more familiar with an area and the offered attractions.

Referring to FIGS. 1-6, system 100 includes one or more personal mobility vehicles 102, one or more kiosks 120, and one or more points of interest 130a-f. Each personal mobility vehicle 102 further includes a navigation system 103 configured to provide autonomous point-to-point navigation within a specified geographic area 101, and one or more sensors 112 configured to detect obstructions proximate to personal mobility vehicle 102, so as to enable navigation system 103 to avoid the detected obstructions. The one or more kiosks 120 are configured to store and simultaneously charge one or more personal mobility vehicles 102. In other examples, personal mobility vehicle 102 includes additional or alternative features, such as a user interface that enables a user to interact with navigation system 103, allowing for the selection of destinations within geographic area 101, including preprogrammed points of interest 130a-f. In still other examples, system 100 includes functionality that allows a user to use a smartphone application to rent and/or summon a personal mobility vehicle 102. Still further examples allow a user to use the smartphone application to interact with navigation system 103 to select a destination.

Figure 1:
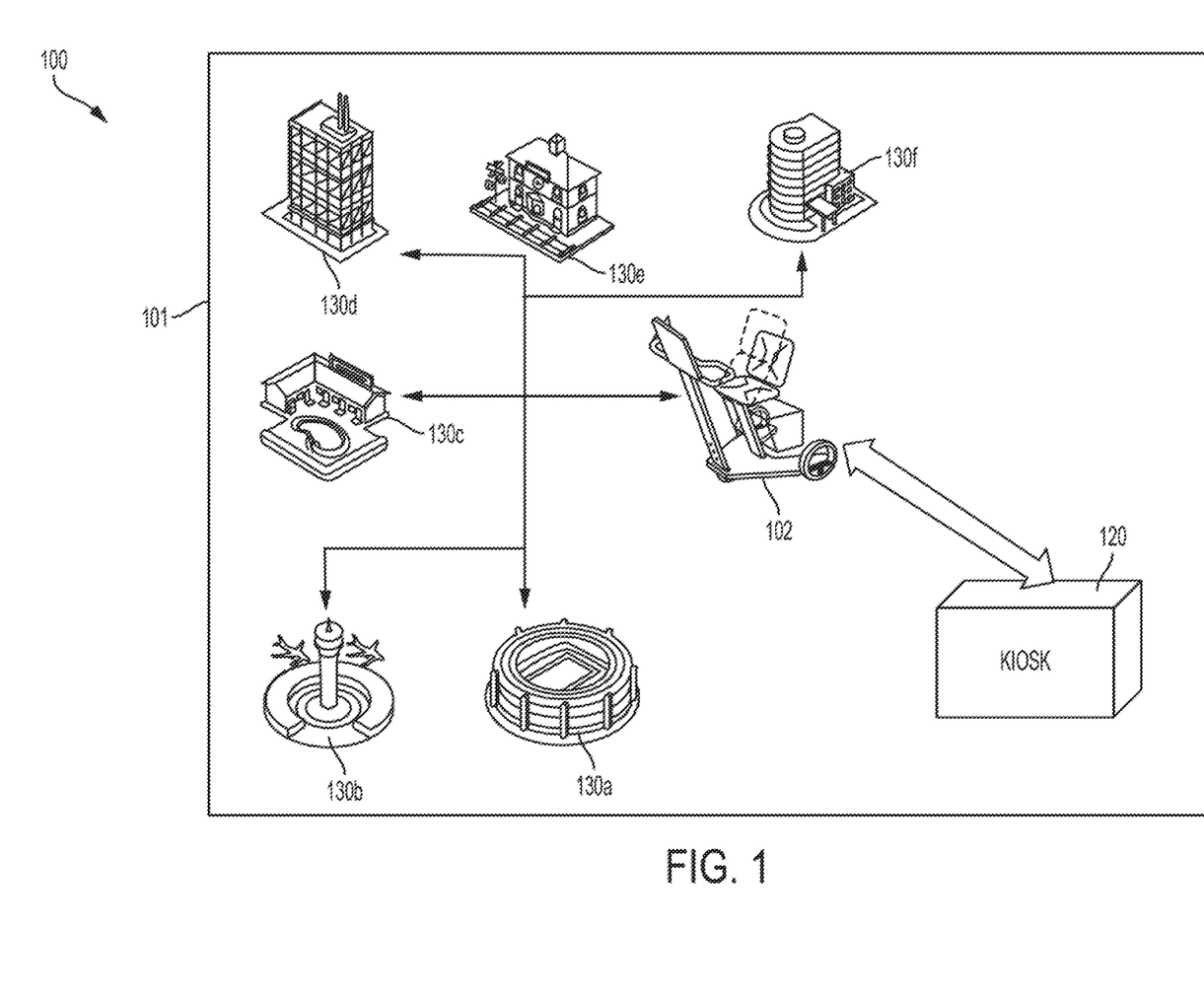
FIG. 1 is a diagram view of an example of an autonomous personal mobility system.

Geographic area 101 defines the outer perimeter of the physical area in which personal mobility vehicles 102 associated with a given system 100 may be used. Navigation system 103 of each personal mobility vehicle 102 may be preprogrammed with the layout of each geographic area 101, as well as the locations of each point of interest 130a-f located within geographic area 101. Combined with the layout of geographic area 101 and positional awareness, navigation system 103 is thereby enabled to provide navigational guidance to a user to any point of interest within geographic area 101 from any arbitrary location within geographic area 101. While geographic area 101 is depicted in FIG. 1 as being a rectangle, a person skilled in the relevant art will appreciate that geographic area 101 can be any arbitrary shape, including irregular shapes tailored to specific geographic features, such as a shopping mall, pedestrian mall, airport, city core, etc.

By limiting navigation system 103 to only locations within geographic area 101, the usefulness of personal mobility vehicle 102 is thereby kept only to geographic area 101, as personal mobility vehicle 102 cannot navigate beyond the boundaries of geographic area 101. Navigation system 103 can further be programmed to deactivate if navigation system 103 senses that personal mobility vehicle 102 is outside of geographic area 101, or can alternatively/ additionally be programmed to automatically return back to within geographic area 101 if it senses it is beyond the boundaries of geographic area 101.

Within geographic area 101 are points of interest 130a-f, which are examples of possible attractions such as stadiums 130a, airports 130b, parks and recreation facilities 130c, office buildings 130d, train stations 130e, and housing/ apartment buildings 130f. It should be understood that these are merely example attractions, and any location within geographic area 101 may be set as a point of interest within navigation system 103. Moreover, navigation system 103 is preferably able to supply routing to any arbitrary location within geographic area 101. "Points of interest 130" will be used herein to refer to any generic point of interest.

Figure 2:
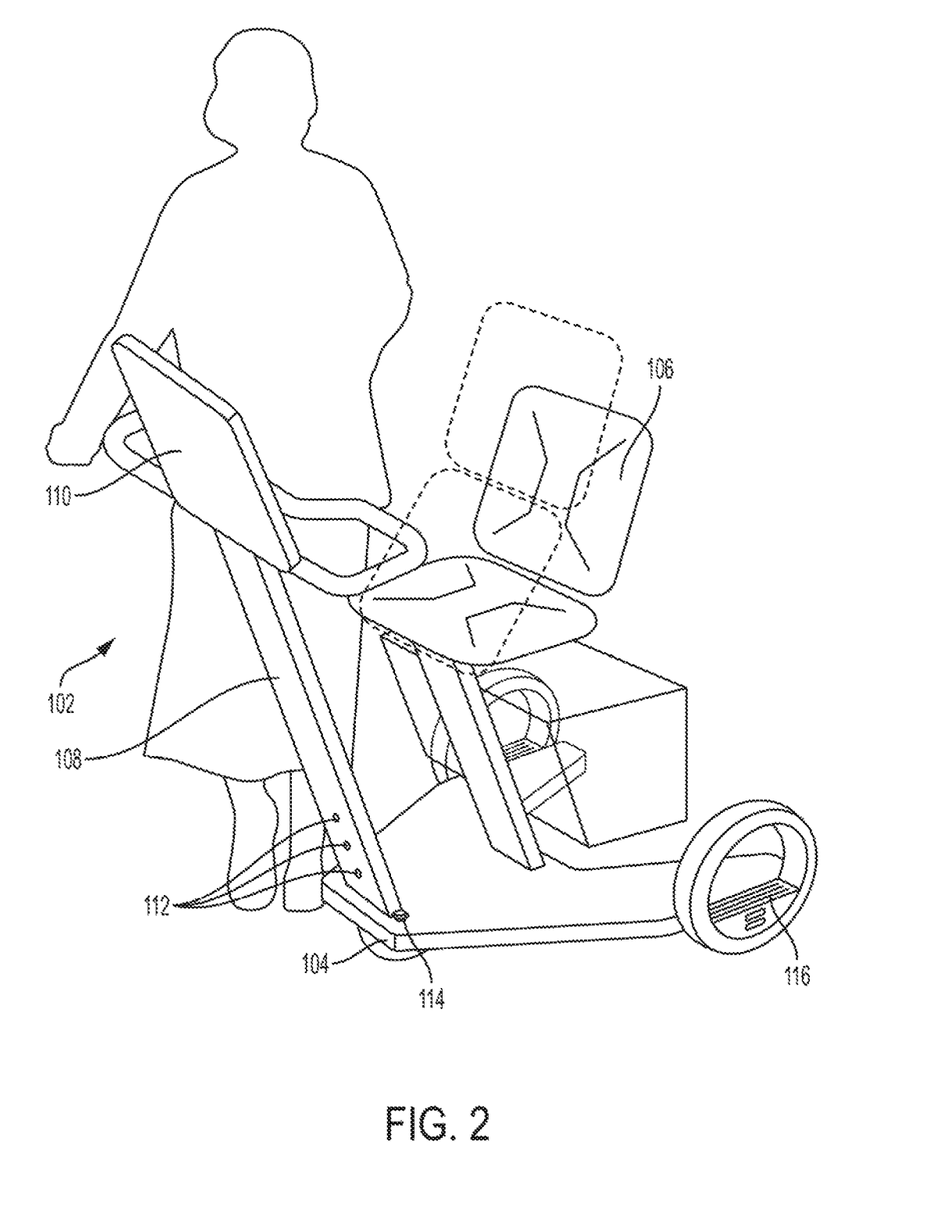
FIG. 2 is a perspective view of an autonomous personal mobility vehicle, shown as part of the FIG. 1 depiction of an autonomous personal mobility system.

As can be seen in FIG. 2, personal mobility vehicle 102 is preferably implemented as a three-wheeled electric powered vehicle. Personal mobility vehicle 102 includes a base 104, which forms the main frame of the vehicle. Onto base 104 are mounted a seat 106 and interface pedestal 108. On top of interface pedestal 108 is mounted an interface display 110, which is in communication with navigation system 103. Also in communication with navigation system 103 are one or more sensors 112 that are configured to detect potential obstacles in the path of personal mobility vehicle 102. Interface pedestal 108 is preferably articulated at pivot point 114, which allows interface pedestal 108 and the attached interface display 110 to swing towards seat 106, thereby reducing the effective footprint of personal mobility vehicle 102 and allowing multiple vehicles 102 to be more space efficient when stored in a kiosk 120. Navigation system 103 is in communication with drive wheels 116, to allow for autonomous navigation of personal mobility vehicle 102 to a point of interest 103 selected by a user on interface display 110.

Where system 100 is implemented in areas that are expected to have a high volume of pedestrians, for safety reasons personal mobility vehicle 102 will typically be configured to travel at speeds that do not exceed a typical pedestrian walking at a brisk pace or a slow jog. Conversely, personal mobility vehicle 102 could travel at higher speeds where used in locations that are protected from foot traffic, or where such foot traffic is not expected.

Base 104 is manufactured from any material that is suitably strong to withstand the weight of the various components of personal mobility vehicle 102. Such materials may include metals such as steel, aluminum, or titanium, plastics, composites, wood or any other suitable material now known or later developed. Base 104 is ideally designed to have a footprint just large enough to accommodate the various components attached thereto, such as seat 106, interface pedestal 108, drive wheels 116 as well as any additional non-driven wheels, any storage or cargo holding accessories if so equipped, and navigation system 103.

Seat 106 is preferably configured to accommodate one adult user, and may be designed to provide an adjustable seating position, to allow a user to adjust seat 106 to maximize comfort. Seat 106 may further be configured to fold into a storage position, or to fold in such a way as to enable a user to use personal mobility vehicle 102 while in a standing or semi-standing position. Seat 106 is preferably constructed from any material or materials known to be suitable for seating, while also being rugged enough to withstand nearly constant usage, in both interior and possibly exterior environments. Such materials may include molded plastic such as ABS or HDPE, which can be molded to form rigid seats, vinyl, leather or fabric to form softer, cushioned seats, or metal or wood, or any other similarly suitable material now known or later developed. Seat 106 may further include a cargo box, handles for attaching bags, removable shopping baskets, or other similar storage attachment, particularly where system 100 is deployed for a geographic area 101 anticipated to attract users that may have luggage, shopping bags, or other items that will need to be carried. It should be appreciated that personal mobility vehicle may configured to accommodate more than one person.

Interface pedestal 108 serves to support interface display 110, and as depicted in FIG. 2, may optionally include handlebars to provide support for a user of personal mobility vehicle 102 while either riding or mounting or dismounting vehicle 102. In some implementations, handlebars or other similar structures may be used to effect manual steering of personal mobility vehicle 102, if a manual guidance mode is enabled. Interface pedestal 108 is preferably made from a metal such as steel or aluminum, from a molded plastic such as ABS or polycarbonate, or from a resin-impregnated composite material such as carbon fiber or fiberglass. However, interface pedestal 108 can be made from any suitably durable material now known or later developed that can support interface display 110 and optional handlebars, as well as withstand daily use in changing interior and/or exterior conditions from multiple users.

Figure 3:
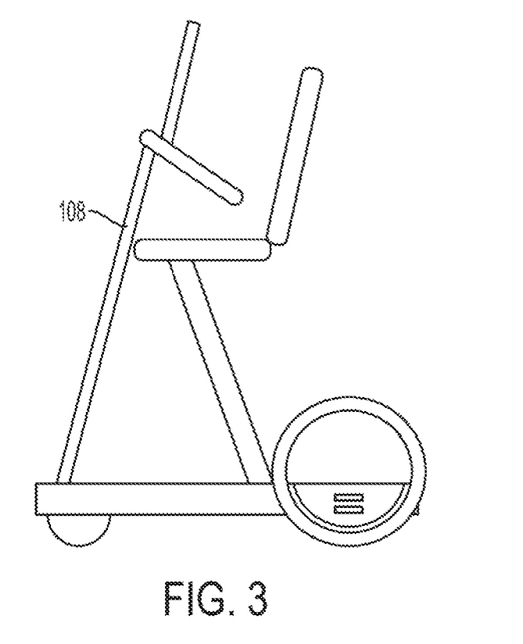
FIG. 3 is a side view of the autonomous personal mobility vehicle shown in FIG. 2, depicting the vehicle in a folded, storage configuration.

As mentioned above, interface pedestal 108 is preferably attached to base 104 by way of a pivot point 114, which enables interface pedestal 108 to pivot towards seat 106, thereby placing personal mobility vehicle 102 into a storage position, depicted in FIG. 3, when docked into kiosk 120. Pivot point 114 may be implemented using a simple hinge mechanism, where interface pedestal 108 is manually moved into storage position. Alternatively, pivot point 114 may be implemented using a motorized mechanism, and can be triggered to move into storage position automatically when signaled by or when approaching kiosk 120 for return and docking. Pivot point 114 is thus implemented using any suitable mechanism that can facilitate interface pedestal 108 moving into a storage configuration on a repeated basis, without incurring appreciable wear, and without compromising the integrity and/or rigidity of interface pedestal 108 when in a use position. Furthermore, in some implementations pivot point 114 may include a locking or latching mechanism to hold interface pedestal 108 fixedly in a use or storage position, to prevent unintended or unwanted movement of interface pedestal 108.

At the top of interface pedestal 108 is preferably mounted an interface display 110, which allows a user of personal mobility vehicle 102 to select a desired point of interest to navigate to, and otherwise interact with navigation system 103. Interface display 110 may also provide updates as to the current location and status of personal mobility vehicle 102. A user interface that could be presented on interface display 110 will be discussed in greater detail herein. Interface display 110 is preferably constructed of durable materials that can withstand repeated daily use, and, depending upon where system 100 is deployed, can provide a visible interface to navigation system 103 that can be viewed in any potential ambient light scenario that may be encountered. Finally, interface display 110 can include a manual override or emergency stop functionality that will allow a rider upon personal mobility vehicle 102 to disable autonomous guidance from navigation system 103 where a potentially dangerous situation is encountered, or where it is determined that navigation system 103 is malfunctioning. In such an event, interface display 110 and/or interface pedestal 108 may provide some means for manual control and steering of personal mobility vehicle 102 if so desired.

Depicted as mounted on the lower portion of interface pedestal 108 are a collection of sensors 112 that are configured to detect objects in proximity to personal mobility vehicle 102. In the depicted embodiments, sensors 112 may be disposed at a lower portion of interface pedestal 108 to detect people, bicycles and objects around personal mobility vehicle 102. Alternatively or additionally, sensors 112 can be mounted upon other locations on base 104 or other structures mounted to base 104, such as seat 106 or a cargo box, wheel fender (if present) or other similar structures, so long as the position(s) enable sensors 112 to adequately detect objects that may pose a collision hazard to personal mobility vehicle 112 while in motion. Sensors 112 may be implemented using any technology capable of reliably detecting objects within proximity of personal mobility vehicle 102, such as infrared or laser range finding, sonic or ultrasonic detection, synthetic vision using cameras, radar, microwave detection, or other suitable technology now known or later developed. As will be described further herein, sensors 112 are in communication with navigation system 103 to alert it to the presence of objects in proximity to personal mobility vehicle 102. The specific range for detection can vary, but should be set in consideration of the closure rate between a detected object and personal mobility vehicle 102, so as to provide navigation system 103 sufficient time to take appropriate action to avoid a collision.

Drive wheels 116 supply motive power to propel personal mobility vehicle 102. In the configuration demonstrated in FIG. 2, personal mobility vehicle 102 has a three-wheel configuration, with two primary drive wheels 116, one each disposed on the left and right sides of base 104, respectively, as well as a free-wheeling front wheel attached to the underside of base 104 approximately under and in line with interface pedestal 108. The front wheel is preferably mounted on a pivot, so that it can caster depending upon the direction of travel of personal mobility vehicle 102. However, other possible wheel configurations are possible, with two-wheel self-balancing configurations possible, as well as four or more wheels; furthermore, the front wheel can optionally also be driven, or steerable. Different wheel configurations may be desirable depending upon the location and terrain of geographic area 101. Hilly areas with varying slopes or possibly uneven terrain may benefit from a four wheel configuration, with all four wheels providing traction, while a tight pedestrian area such as a mall or city core with relatively flat, smooth surfaces may be better served with a three wheel (or even two wheel) configuration to minimize space consumption.

In addition to propulsion, drive wheels 116 can provide steering by differential powering, where the wheel on the outside of a turn is run faster than the inside wheel, e.g. to turn right, the left wheel is driven faster than the right. In such configurations, the front wheel or wheels either can pivot or freewheel. Other configurations may have the front wheel or wheel be attached to a servo mechanism to provide positive steering, similar to conventional vehicles such as motorcycles, ATVs and cars. In still other configurations, all wheels are powered, and steering is coordinated by differential power, or by a combination of power and a servo-driven steering wheel.

Drive wheels 116 are preferably powered by a hub-mounted traction motor configuration, with one traction motor 117 (shown in FIG. 6) corresponding to and configured to supply force to each drive wheel 116. However, this is only one possible drive configuration. Other possible useful configurations could include traction motors 117 that are mechanically connected to each drive wheel 116 via axles, or a single traction motor 117 connected to an axle commonly shared by each drive wheel. Depending upon the configuration of the traction motor(s) 117, a gear reduction or transmission may be utilized between the traction motor(s) 117 and the drive wheels 116. Such mechanisms are well known in the art.

Traction motors 117 are typically implemented using a DC motor technology, as personal mobility vehicle 102 will preferably be powered by a rechargeable DC battery pack. Such technology can include either brushed or brushless (electronically commutated) motor technology, although any now known or later developed technology for electric propulsion may be utilized. Usable battery technology may include lead acid, nickel-metal-hydride, lithium-ion or lithium-polymer chemistries, or any other chemistry now existing or subsequently developed that can meet high power demands from traction motors 117. Furthermore, where system 100 is primarily implemented in outdoors venues, traction motors 117 could be implemented using internal combustion engines, with an appropriate fuel reservoir substituted for batteries.

Drive wheels 116 are preferably equipped with non-pneumatic tires, manufactured from materials such as solid rubber or elastomeric plastic, or any other material suitable for use as a tire, such as wood, metal, or composite. However, other configurations may use pneumatic tires, which further may be tubeless or utilize an inner tube. The tires are preferably mounted to a rim manufactured from a sturdy material, such as steel, cast aluminum, carbon fiber, or other suitable material now known or later developed in the art. The rim may be of a conventional configuration, allowing for interchangeable tires, or may be integrated into the tire at manufacturing, where tires and rims are replaced as a single unit.

Figure 6:
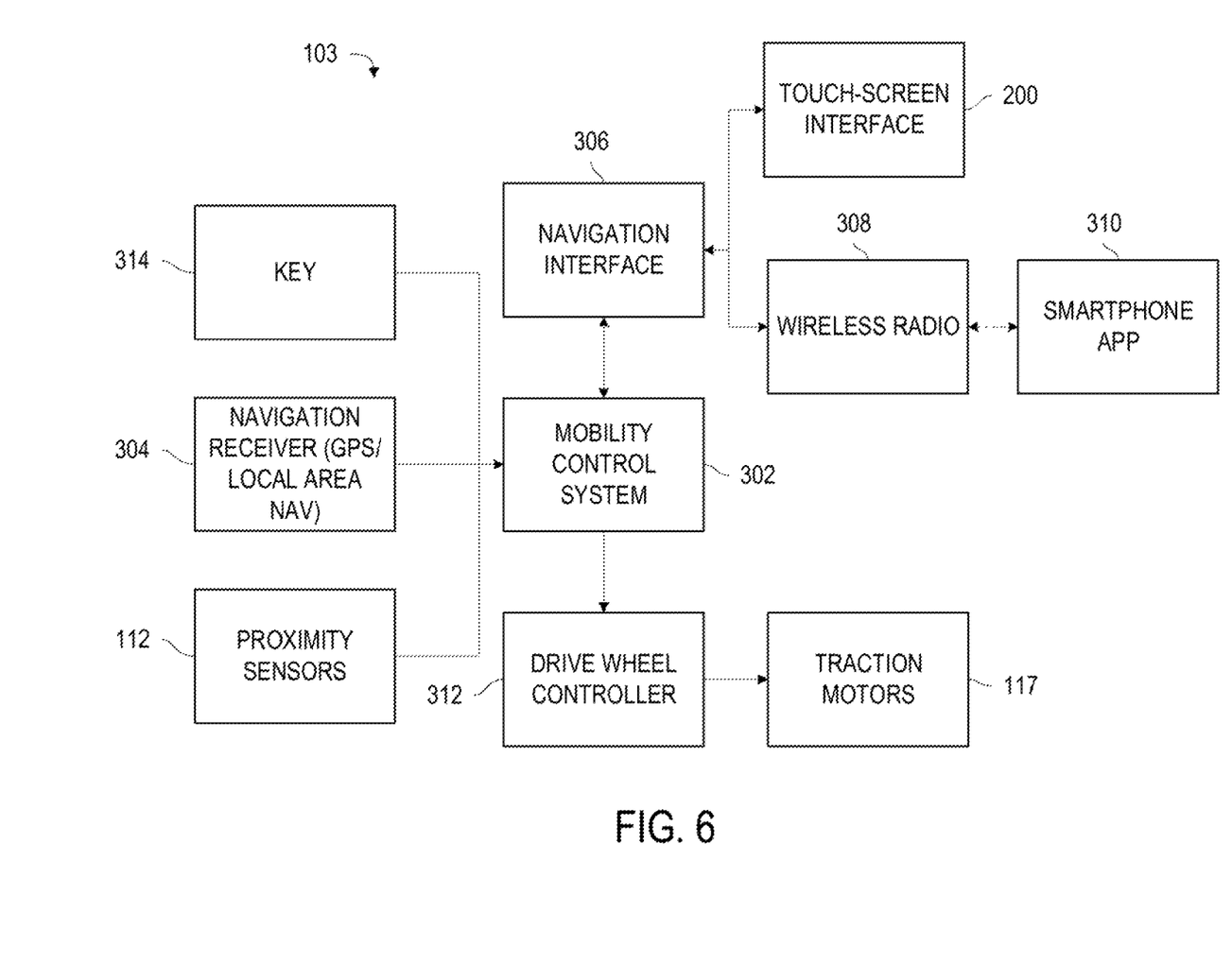
FIG. 6 is a block diagram view of the navigation system of the autonomous personal mobility vehicle shown in FIG. 2.

In the example shown in FIG. 6, the possible basic components of one implementation of navigation system 103 are depicted in block diagram format. Example navigation system 103 is comprised of a mobility control system 302, which receives data from an object collision avoidance system including proximity sensors 112 and navigation receiver 304. Mobility control system 302 is in two-way communication with navigation interface 306, though which users of personal mobility vehicle 102 may select a point of interest 130. Following selection, mobility control system 302 communicates with drive wheel controller 312, which is turn controls the speed of traction motors 117. In some embodiments, mobility control system 302 further includes a key 314 configured to activate an operation of the personal mobility vehicle. The key may be a physical key or may be an identification code or a password entered by a user via a touch screen interface 200. The identification code may be associated with a service provider who rents personal mobility vehicle 102 or an owner of the personal mobility vehicle 102. The identification code may further enable a user to navigate a specific geographic region authorized by the service provider. In other words, in some embodiments, personal mobility vehicle 102 may be only operated in a specific geographic region according to the identification code. A person skilled in the relevant art will recognize this as merely a functional description, and the actual supporting electronics will likely be more complex and have additional components not shown in FIG. 6.

Mobility control system 302 is preferably implemented using a commercially available general-purpose processor, such as a processor from the Intel® or ARM® architecture families. Mobility control system 302 may be implemented in a system on a chip (SoC) configuration, to include other system components such as RAM, flash storage and I/O buses. Alternatively, mobility control system 302 can be implemented using purpose-built integrated circuits, or any other suitable technology now known or later developed. Mobility control system 302 also includes a memory unit that includes executable instructions implementing the basic functionality of navigation system 103 and a database of locations in geographic area 101. Basic functionality includes interaction with navigation interface 306 to receive user selections of locations in geographic area 101, receipt of navigational data from navigation receiver 304 and proximity sensors 112, computation of a navigational path from the current location of personal mobility vehicle 102 to the user selected location, and instructions to drive wheel controller 312 to autonomously navigate personal mobility vehicle to the user selected location without further user interaction.

Navigation receiver 304 is preferably implemented as a GPS receiver, and/or other related satellite navigation system such as GLONASS, Galileo, or other similar system. Additionally, navigation receiver 304 can be configured to receive locally-based navigation cues to aid in precise navigation through tight areas. Such locally-based navigation cues can include purpose-built location beacons placed throughout geographic area 101 that enable exact location of various points of interest, as well as known technologies such as cell tower triangulation and use of known-location WiFi hotspots. Any location technology now known or later developed that can provide a high precision location (e.g. preferably within a foot) can be useful as part of navigation receiver 304.

Sensors 112 work in connection with navigation receiver 304 to provide precise situational awareness to mobility control system 302 for autonomous navigation. Sensors 112 alert mobility control system 302 to the presence of nearby obstacles and, preferably, their relative distance and trajectory with respect to personal mobility vehicle 102. Mobility control system 302 combines information from navigation receiver 304, such as current position and speed, along with detected objects from sensors 112 to compute a safe path towards a selected destination that avoids collisions. Sensed obstacles can include other vehicles, pedestrians, animals, structures, curbs, and other random objects. In some implementations sensors 112 may be configured to determine the lateral dimensions of the path upon which personal mobility vehicle 102 is traveling, e.g. determining relative distance from the side of a sidewalk or curb, to help aid mobility control system 302 in maintaining precise navigation on a particular path.

Navigation interface 306 allows a user of personal mobility vehicle 102 to select a destination within geographic area 101. In addition, navigation interface 306 can provide additional information for various points of interest 130, such as historical or reference facts. For example, where point of interest 130 is a shopping center, navigation interface 306 can present information such as various stores and attractions that are located in the shopping center, hours of operation, etc. Similarly, where point of interest 130 is a recreation center or sports center, navigation interface 306 can present information on upcoming events, ticket availability and prices, and similar such data. Such data is typically stored in a database file either located as part of memory in mobility control system 302, or possibly in navigation interface 306, if configured with a separate database.

As shown in FIG. 6, navigation interface 306 further is in communication with touch screen interface 200 and/or a wireless radio 308, which enables communication with a smartphone application (app) 310. Touch screen interface 200 is one possible implementation of interface display 110, while wireless radio 308 is preferably in data communication with a wireless Internet access network, such as a cellular telephone provider's data network. In this way, wireless radio 308 can be reached and exchange data communications with a user's smartphone running an appropriate app, which can allow a user to interact with navigation interface 306 using their smartphone in addition to or in lieu of interface display 110. Such functionality is useful where a user wishes to summon personal mobility vehicle 102 while apart from it, or if a user wishes to easily program a location or attraction found on their smartphone without needing to separately find it on a potentially unfamiliar interface display 110, for example. Wireless radio 308 can be implemented using any known or later developed wireless technology useful for data communications. Such technologies may include WiFi, Bluetooth, and cellular technologies such as TDMA, CDMA, HSPDA, LTE, and GSM, to name a few examples.

Figure 4:
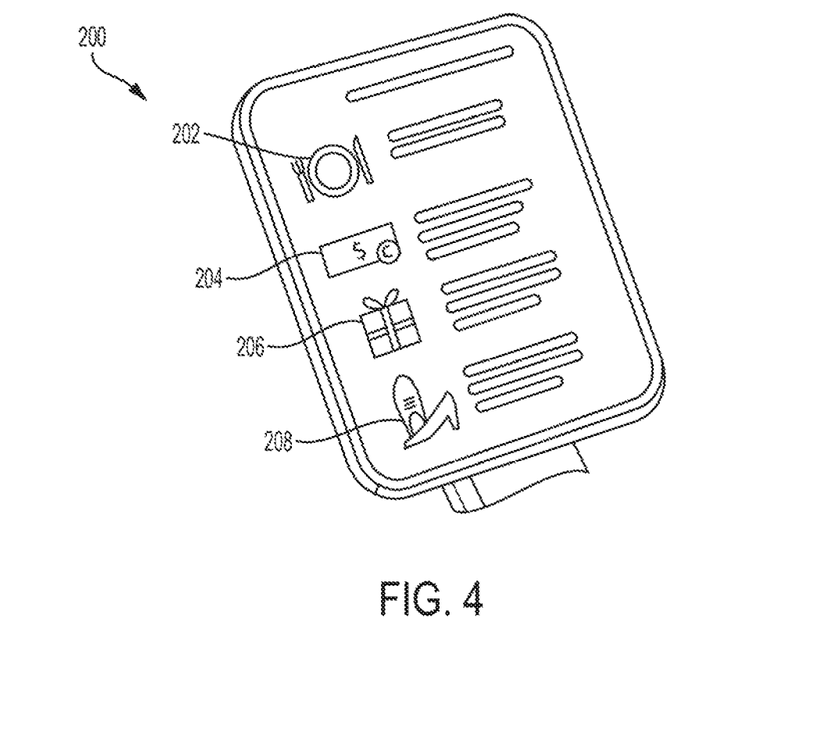
FIG. 4 is a front view of the touchscreen navigation system interface of the autonomous personal mobility vehicle shown in FIG. 2.

FIG. 4 shows an example of touch screen interface 200. On the display are pictured icons 202, 204, 206 and 208 for food and dining, banking/currency exchange, gifts and souvenirs, and shopping, respectively. As with points of interest 130*a-f*, these are examples of possible points of interest 130 that touch screen interface 200 may present to a user, such as may be found when system 100 is implemented in a mall, pedestrian district, or city shopping district. It should be understood that the selection of icons and attractions will vary and is intended to be customized depending upon the nature of geographic area 101. Moreover, it should be understood that the layout depicted in FIG. 4 is one arbitrary possibility, and touch screen interface is preferably customized to each particular deployment of system 100. Where touch screen interface 200 is implemented in an area likely to attract users with different language abilities, touch screen interface 200 can be programmed to allow a language selection, to accommodate the most likely native languages of visitors to geographic area 101. Finally, touch screen interface 200 can be used to help monetize system 100, by offering ad space and promoted spots in connection with points of interest 130, such as featured stores, sponsored personal mobility vehicles 102, on the fly coupons designed to attract users to particular stores and other points of interest 130, and any other similar marketing promotions.

Smartphone app 310 can substantially duplicate the functionality of touch screen interface 200, offering comparable layouts and promotions. Furthermore, smartphone app 310 could be integrated with other smartphone services, such as phone and web browser functionality. Depending upon the needs of a particular implementation of system 100, smartphone app 310 could be designed to work with multiple implementations of system 100, or could be custom-tailored with a single app that is dedicated to one geographic area 101 and one implementation of system 100.

Turning back to FIG. 6, mobility control system 302 is connected to one or more drive wheel controllers 312, which in turn operates one or more traction motors 117. Communication with drive wheel controllers 312 thereby enables mobility control system 302 to autonomously navigate to selected points of interest 130. Drive wheel controller 312 can be implemented using existing and well-known motor control technology. For example, where each traction motor 117 is a brushless DC motor, drive wheel controller 312 may be implemented as an electronic speed control specific for brushless motors. Likewise, drive wheel controller 312 may be implemented to support whichever traction motor technology is utilized. It will be understood by a person skilled in the relevant art that drive wheel controller 312 should be sized so as to handle the power load presented by traction motors 117.

Figure 5A:
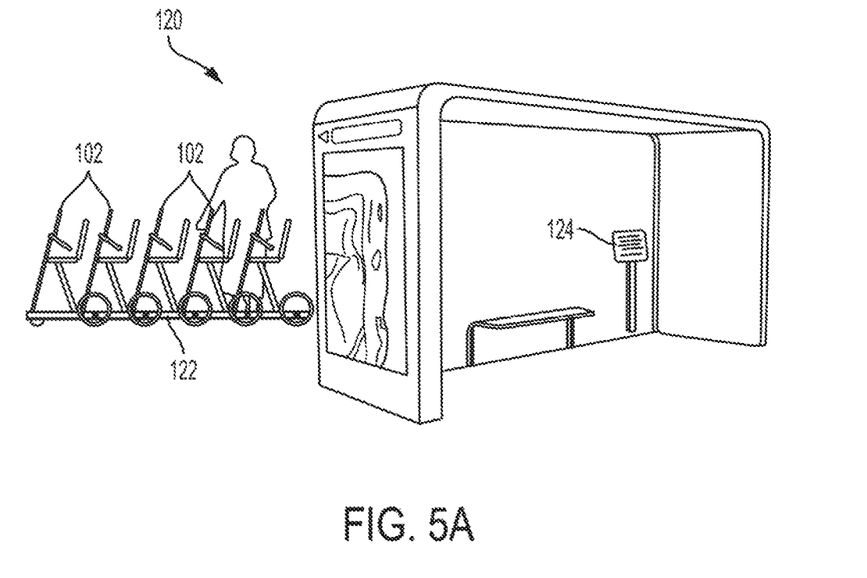
FIG. 5A is a perspective view of a kiosk, shown as part of the FIG. 1 depiction of an autonomous personal mobility system.
Figure 5B:
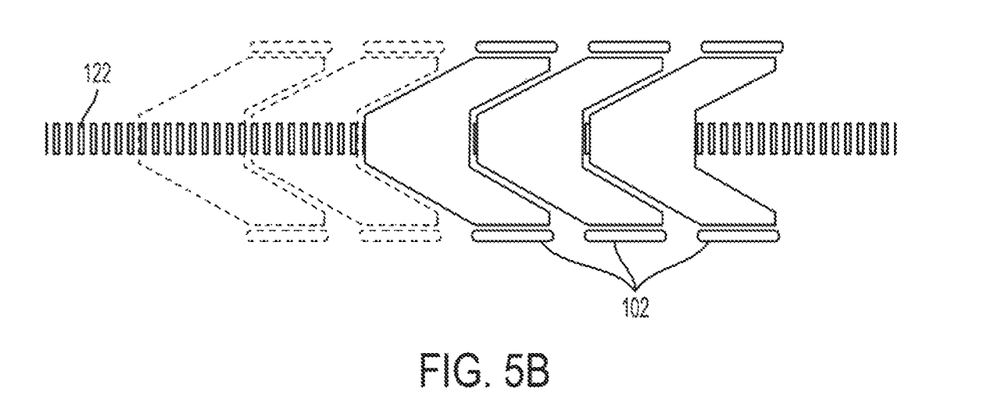
FIG. 5B is an overhead view of a charging rail, part of the kiosk shown in FIG. 5A.

Referring now to FIGS. 5A and 5B, an example kiosk 120 is depicted. While FIG. 1 only depicts a single kiosk 120, system 100 could be implemented with multiple kiosks within a single geographic area 101 depending upon the size of geographic area 101. Kiosk 120 primarily serves as a storage and charge facility for personal mobility vehicles 102. Kiosk 120 is equipped with a storage and charging rail 122, and a terminal 124.

As shown in the kiosk example in FIG. 5B, storage and charging rail 122 is configured to receive multiple personal mobility vehicles 102 configured in a storage position, as depicted in FIG. 3. Storage and charging rail 122, and corresponding personal mobility vehicles 102, are preferably configured to charge batteries on board personal mobility vehicles 102 inductively, where personal mobility vehicles 102 are continuously charged regardless of position upon the rail. Alternatively, storage and charging rail 122 can be configured to provide contact-based charging of personal mobility vehicles 102, possibly with a plurality of charging sockets, or a continuous series of contact strips where personal mobility vehicles 102 can charge regardless of rail position.

For storage purposes, storage and charging rail 122 can be shaped to fit into a corresponding channel located on base 104 of personal mobility vehicle 102, which simultaneously brings the rail 122 into proximity with charging circuitry on board personal mobility vehicle 102, and potentially locks personal mobility vehicle 102 onto storage and charging rail 122 so as to prevent removal of a personal mobility vehicle 102 without prior authorization and/or payment. As depicted in FIG. 5B, storage and charging rail 122 is preferably configured with a one-way flow, with personal mobility vehicles 102 being returned at one end, being placed into a storage configuration as they slide onto the rail, and removed from the opposing end of storage and charging rail 122 as they are checked out. In this configuration, personal mobility vehicles 102 are provided on a first end-first out sequence, ensuring that as personal mobility vehicles 102 are returned, they are also afforded time to recharge.

Storage and charging rail can be constructed from any suitable material that is capable of securely holding multiple personal mobility vehicles 102 in place, while conducting electricity for charging purposes. Such materials may include metals, plastics, composites, wood, or a combination of the foregoing, or any other suitable material or combination of materials now known or later developed.

Each kiosk 120 is preferably equipped with a terminal 124, which allows for renting/checking out of a personal mobility vehicle 102. To this end, terminal 124 can be equipped with a mechanism for accepting payment, such as by credit card, contactless smartphone payment such as Apple Pay or Samsung Pay, or cash. Terminal 124 can also be configured to accept key 314, as described above, in addition to interface display 110 and/or smartphone app 310. Terminal 124 can also optionally offer information about geographic area 101, as well as likely points of interest 130. Such functionality could also be provided by smartphone app 310, thereby allowing a user to pay using stored payment information on his or her smartphone. Kiosk 120 can also provide an estimated time of personal mobility vehicle 102 availability where there are no personal mobility vehicles 102 that have yet obtained a sufficient charge, and/or where all personal mobility vehicles 102 are in use. Such information can be provided to a user either via terminal 124, or via smartphone app 310.

Further to this end, where a user uses a smartphone app 310, it is possible to implement functionality where a user can remotely pay for and summon a personal mobility vehicle 102. In such an implementation, smartphone app 310 would transmit its location (and thus the location of the user) to system 100, which would then instruct navigation system 103 of a selected personal mobility vehicle 102 to autonomously travel to the location of the user. In some embodiments, a manual operation mode may not be available or is disabled when mobility vehicle is driving without a passenger, to prevent an unauthorized person from gaining control of personal mobility vehicle 102 during no-passenger trips.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. An autonomous personal mobility system, comprising:
one or more personal mobility vehicles, each personal mobility vehicle comprising:
a key to activate an operation, the key including an identification code associated with a service provider, wherein the personal mobility vehicles are authorized to operate only in a specific geographic area according to the identification code,
a navigation system including:
a mobility control system including a database of locations in the specific geographic area,
a touch screen interface configured to present a plurality of points of interest within the specified geographic area according to the identification code,
a navigation interface communicated with the mobility control system and the touch screen interface for a user to select a point of interest from the touch screen interface, wherein the point of the interest is one of the locations within the specific geographic area, and
one or more sensors configured to detect obstructions proximate to the personal mobility vehicle, so as to enable the navigation system to avoid the detected obstructions,
wherein the mobility control system is configured to receive the selected point of interest from the navigation interface and compute a navigation path from a current location of the personal mobility vehicle to the selected point of interest and instruct a drive wheel controller to navigate the personal mobility vehicle to the selected point of interest automatically according to the information from the navigation system and the sensors, and
wherein the personal mobility vehicle is deactivated when the navigation system determines that the personal mobility vehicle is outside the specific geographic area; and
one or more kiosks configured to store the one or more personal mobility vehicles and charge the one or more personal mobility vehicles while stored and electrically communicated with the kiosks.

2. The autonomous personal mobility system of claim 1, further comprising a smartphone application that allows a user to summon a personal mobility vehicle while the user is apart from the personal mobility vehicle, and interact with the navigation system.

3. The autonomous personal mobility system of claim 1, wherein the specified geographic area is an airport, a shopping center, a transportation hub, a tourist attraction, or an urban core.

4. The autonomous personal mobility system of claim 1, further comprising a smartphone application, wherein the smartphone application is further configured to transmit the location of the user to the navigation system, and the navigation system is further configured to navigate the personal mobility vehicle to the user's location upon the user's request.

5. The autonomous personal mobility system of claim 1, wherein each of the one or more kiosks charges the one or more personal mobility vehicles via an induction charging rail.

6. The autonomous personal mobility system of claim 5, wherein each of the one or more kiosks further allows one of the personal mobility vehicles to be rented.

7. The autonomous personal mobility system of claim 1, wherein each of the personal mobility vehicles has a three-wheel configuration.

8. The autonomous personal mobility system of claim 7, wherein each of the personal mobility vehicles is foldable so as to minimize space consumed in one of the kiosks.

9. A personal mobility vehicle for renting by a service provider, comprising:
a key to start an operation, the key including an identification code associated with the service provider for a user to operate the personal mobility vehicle only in a specific geographic area authorized according to the identification code;
a navigation system including:
a mobility control system including a database of locations in the specific geographic area,
a touch-screen interface configured to present a plurality of points of interest within the specified geographic area according to the identification code, wherein the points of interest correspond to the locations in the specific geographic area;
a navigation interface communicated with the mobility control system and the touch screen interface for a user to select a point of interest;
an object collision avoidance system to detect presence of objects surrounding the personal mobility vehicle; and
a drive wheel controller,
wherein the mobility control system is configured to receive the selected point of interest from the navigation interface and compute a navigation path from a current location of the personal mobility vehicle to selected point of interest and instruct the drive wheel controller to navigate the personal mobility vehicle to the selected point of interest automatically according to the information from the navigation system and the object collision avoidance system and wherein the personal mobility vehicle is deactivated when the navigation system determines that the personal mobility vehicle is outside the specific geographic area.

10. The personal mobility vehicle of claim 9, wherein the mobility control system is further configured to control the drive wheel controller to follow a traffic flow at a walking pace or a jog pace.

11. The personal mobility vehicle of claim 9, wherein the personal mobility vehicle is a three-wheel vehicle, and includes a seat movably attached to a base to enable a storage and stack mode, the personal mobility vehicle further configured to allow a seated posture and a standing posture of the user, wherein the personal mobility vehicle further includes a pivoting deck and a touch screen including the user interface.

12. The personal mobility vehicle of claim 9, wherein the drive system includes two non-pneumatic type drive wheels and a motor mounted on a hub and a rechargeable battery to power the motor; wherein steering is provided by left-only, right-only, forward and reverse electronic actuation of the drive wheels.

13. The personal mobility vehicle of claim 9, further comprising a manual driving button on the user interface, wherein an autonomous driving mode is overridden when the user activates a manual operation mode via the manual driving button.

14. The personal mobility vehicle of claim 9, wherein the mobility control system is configured to receive specific destination information from the service provider and causes display of the specific destination information on the user interface, wherein the specific destination information includes at least one of new books available at a library, a gate or a flight information from an airport, shopping information for a shopping mall, zone access restriction based on security, safety, and theft prevention.

15. The autonomous personal mobility vehicle of claim 9, further comprising a smartphone application, wherein the smartphone application is further configured to transmit the location of the user to the navigation system, and the navigation system is further configured to navigate the personal mobility vehicle to the user's location upon the user's request.

16. The personal mobility vehicle of claim 15, further comprising a manual driving button on the user interface, wherein an autonomous driving mode is overridden when the user activates a manual operation mode via the manual driving button, and wherein the manual operation mode is disabled when the personal mobility vehicle is navigated without the user.

* * * * *